(12) United States Patent
Mujumdar et al.

(10) Patent No.: US 11,132,500 B2
(45) Date of Patent: Sep. 28, 2021

(54) ANNOTATION TASK INSTRUCTION GENERATION

(71) Applicant: International Business Machines Corporation, Armonk, NY (US)

(72) Inventors: Shashank Mujumdar, Nagpur (IN); Nitin Gupta, Saharanpur (IN); Arvind Agarwal, Gurgaon (IN); Sameep Mehta, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 16/528,293

(22) Filed: Jul. 31, 2019

(65) Prior Publication Data

US 2021/0034698 A1    Feb. 4, 2021

(51) Int. Cl.
| | | |
|---|---|---|
| *G06F 40/169* | (2020.01) | |
| *G06K 9/62* | (2006.01) | |
| *G06F 40/56* | (2020.01) | |
| *G06N 5/04* | (2006.01) | |
| *G06F 17/00* | (2019.01) | |

(52) U.S. Cl.
CPC .......... *G06F 40/169* (2020.01); *G06F 40/56* (2020.01); *G06K 9/623* (2013.01); *G06N 5/04* (2013.01)

(58) Field of Classification Search
CPC ........ G06F 40/169; G06F 40/56; G06F 17/21; G06F 17/27; G06F 17/76; G06F 17/3043; G06F 17/30654; G06F 17/30864; G06K 9/623; G06N 5/04; G06N 99/005
See application file for complete search history.

(56) References Cited

U.S. PATENT DOCUMENTS

| | | | |
|---|---|---|---|
| 9,355,359 B2 | 5/2016 | Welinder et al. | |
| 9,582,490 B2 | 2/2017 | Simard et al. | |
| 2006/0074634 A1* | 4/2006 | Gao | G06F 40/211 704/9 |
| 2015/0317561 A1* | 11/2015 | Allen | G06N 5/04 706/12 |
| 2016/0148077 A1* | 5/2016 | Cox | G06K 9/6263 382/159 |
| 2017/0293859 A1 | 10/2017 | Gusev et al. | |
| 2017/0323211 A1 | 11/2017 | Bencke et al. | |
| 2019/0012302 A1* | 1/2019 | MacMahon | G06F 17/30882 |
| 2020/0167671 A1* | 5/2020 | Okada | G06F 8/60 |

* cited by examiner

*Primary Examiner* — Quoc A Tran
(74) *Attorney, Agent, or Firm* — Ference & Associates LLC

(57) ABSTRACT

One embodiment provides a method, including: receiving, from a client, (i) a task of annotating information, (ii) a set of instructions for performing the task, and (iii) client annotations for a subset of the information within the task; assigning the subset to a plurality of annotators; obtaining (i) annotator annotations for the subset and (ii) a response time for providing the annotator annotation for each piece of information within the subset; identifying improvements to the set of instructions by (i) comparing the annotator annotations to the client annotations and (ii) identifying discrepancies made by the annotators in view of the response time; and generating a new set of instructions, wherein the generating comprises (i) identifying at least one feature of the information that distinguishes correctly annotated information from incorrectly annotated information and (ii) generating an instruction from the at least one feature.

17 Claims, 4 Drawing Sheets

ANNOTATION TASK INSTRUCTION GENERATION

BACKGROUND

Annotation tasks require a user to label, translate, select information fulfilling a parameter, or otherwise provide information with regard to provided information. Generally when annotating information for a purpose, an entity may have a large amount of information to annotate. For example, if an entity is utilizing annotated information to train a machine-learning model and/or algorithm, the entity needs a large amount of information so that the machine-learning model can learn more accurately. Thus, the annotation task may become very time-consuming. Accordingly, many entities employ a crowdsourcing technique in order to provide such annotations. The entity or user may provide the information requiring annotation to a crowdsourcing platform that includes many different annotators or crowdsourced workers. The annotation task can then be assigned to one or more annotators who then annotate the information using the rules or instructions provided by the requesting entity or annotation client. The annotated information is then provided back to the requesting entity, or client, who can then use the annotated information as desired.

BRIEF SUMMARY

In summary, one aspect of the invention provides a method, comprising: receiving, from a client, (i) a task of annotating information, (ii) a set of instructions for performing the task, and (iii) client annotations for a subset of the information within the task, wherein the client annotations identify correct annotations for the subset of information; assigning the subset to a plurality of annotators; obtaining, from each of the plurality of annotators, (i) annotator annotations for the subset and (ii) a response time for providing the annotator annotation for each piece of information within the subset; identifying improvements to the set of instructions by (i) comparing the annotator annotations to the client annotations and (ii) identifying, from the comparing, discrepancies made by the annotators in view of the response time; and generating, based on the improvements, a new set of instructions for the task, wherein the generating comprises (i) identifying at least one feature of the information that distinguishes correctly annotated information from incorrectly annotated information and (ii) generating an instruction from the at least one feature.

Another aspect of the invention provides an apparatus, comprising: at least one processor; and a computer readable storage medium having computer readable program code embodied therewith and executable by the at least one processor, the computer readable program code comprising: computer readable program code configured to receive, from a client, (i) a task of annotating information, (ii) a set of instructions for performing the task, and (iii) client annotations for a subset of the information within the task, wherein the client annotations identify correct annotations for the subset of information; computer readable program code configured to assign the subset to a plurality of annotators; computer readable program code configured to obtain, from each of the plurality of annotators, (i) annotator annotations for the subset and (ii) a response time for providing the annotator annotation for each piece of information within the subset; computer readable program code configured to identify improvements to the set of instructions by (i) comparing the annotator annotations to the client annotations and (ii) identifying, from the comparing, discrepancies made by the annotators in view of the response time; and computer readable program code configured to generate, based on the improvements, a new set of instructions for the task, wherein the generating comprises (i) identifying at least one feature of the information that distinguishes correctly annotated information from incorrectly annotated information and (ii) generating an instruction from the at least one feature.

An additional aspect of the invention provides a computer program product, comprising: a computer readable storage medium having computer readable program code embodied therewith, the computer readable program code executable by a processor and comprising: computer readable program code configured to receive, from a client, (i) a task of annotating information, (ii) a set of instructions for performing the task, and (iii) client annotations for a subset of the information within the task, wherein the client annotations identify correct annotations for the subset of information; computer readable program code configured to assign the subset to a plurality of annotators; computer readable program code configured to obtain, from each of the plurality of annotators, (i) annotator annotations for the subset and (ii) a response time for providing the annotator annotation for each piece of information within the subset; computer readable program code configured to identify improvements to the set of instructions by (i) comparing the annotator annotations to the client annotations and (ii) identifying, from the comparing, discrepancies made by the annotators in view of the response time; and computer readable program code configured to generate, based on the improvements, a new set of instructions for the task, wherein the generating comprises (i) identifying at least one feature of the information that distinguishes correctly annotated information from incorrectly annotated information and (ii) generating an instruction from the at least one feature.

A further aspect of the invention provides a method, comprising: obtaining (i) instructions for performing a labeling task, (ii) a set of samples from the labeling task, and (iii) correct labels for each of the samples in the set; providing the set of samples, without the correct labels, to a plurality of labelers; receiving, from each of the plurality of labelers, (i) labels for each of the samples in the set and (ii) response times for each of the samples indicating a length of time the labeler took to provide the label for the sample; determining additional instructions to be added to the instructions based upon the labels and the response times, wherein the determining comprises (i) identifying unclear areas of the instructions by comparing the labels with the correct labels, thereby identifying incorrect labels provided by the labelers and (ii) identifying the labels having a response time over a predetermined time threshold; and creating a new set of instructions for the labeling task by generating the additional instructions using features of entities within the samples that differentiate between samples fulfilling the instructions and samples not fulfilling the instructions, wherein the generating comprises (i) classifying each of the samples into one of: a positive group including samples correctly labeled by the labelers and a negative group including samples incorrectly labeled by the labelers and (ii) using a feature extraction technique to extract features from the samples in each of the positive group and negative group to identify differentiating features.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
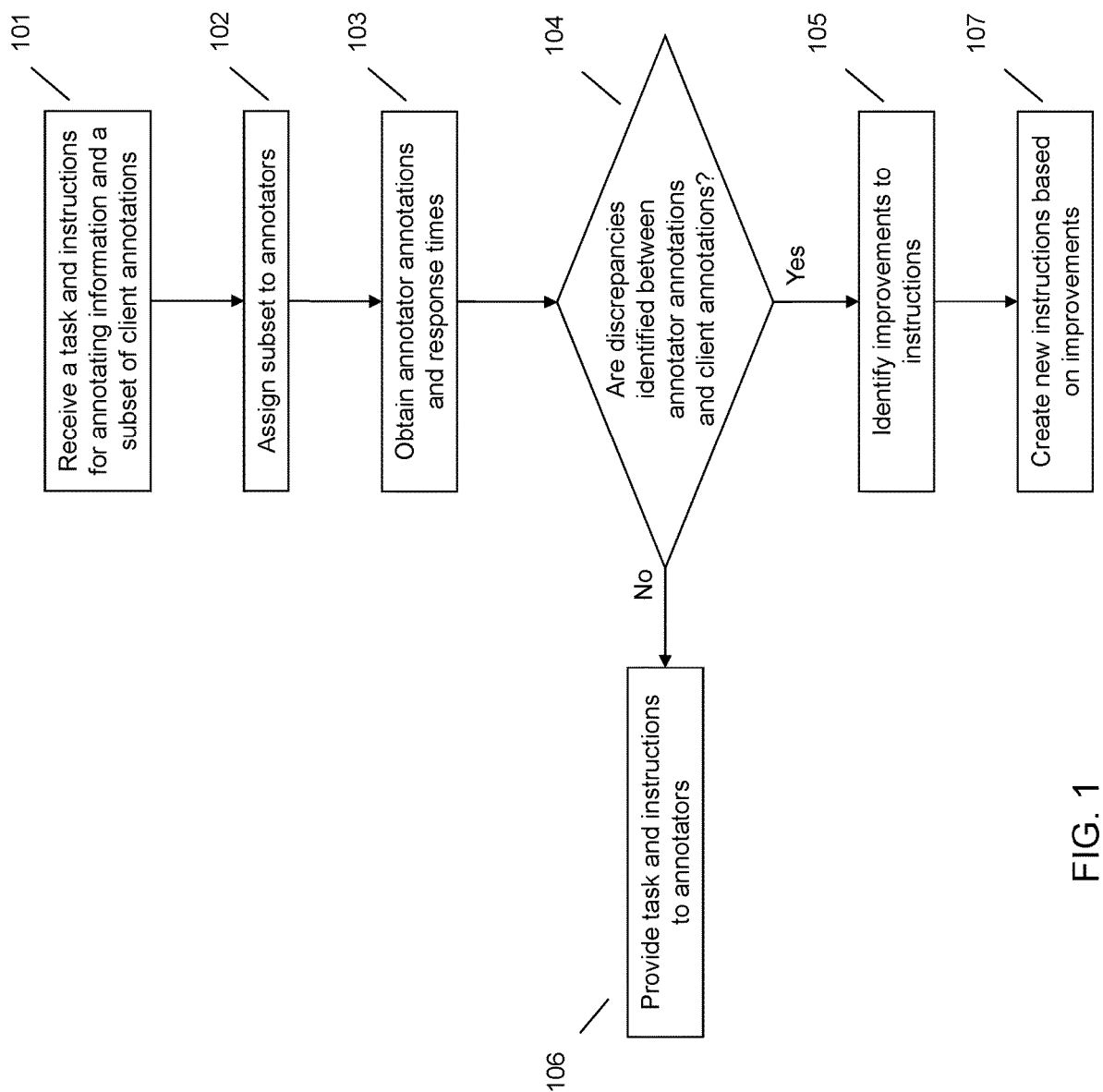
FIG. 1 illustrates a method of generating instructions for an annotation task in order to reduce mistakes made by annotators performing the annotation task.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Utilizing a crowdsourcing technique to annotate information allows an entity to obtain annotated information quickly. However, by utilizing a crowdsourcing technique the entity loses some control over how the annotations are completed. For example, by utilizing a crowdsourcing technique the entity can no longer ensure that the annotations are being performed as the entity expects. Accordingly, the entity provides instructions for performance of the annotations. These instructions are provided to all the annotators who are selected for performing the annotation task. However, while these instructions may be clear to the providing entity, the instructions may be unclear or confusing to the annotators. For example, if the providing entity provides an instruction to select all images with people wearing a particular color of clothing, an annotator may not know if that means the person has to be wearing only that color of clothing, has to be wearing a single piece of clothing in that color, or a certain type of clothing needs to be a particular color. Such confusion may result in annotations that are incomplete or incorrect. The incomplete or incorrect annotations may result in inaccurate information being used for the downstream tasks, for example, training a machine-learning model.

There is currently no technique for identifying confusing or unclear instructions for annotation tasks. Since the annotation task is crowdsourced it may even be difficult for an annotator to ask for clarification regarding the annotation task and/or instructions provided with the annotation task. Rather, the requesting entity must review at least some of the received annotated information to determine whether the annotations fulfill the intent of the requesting entity. If the annotated information is inaccurate or misleading, the requesting entity may then need to discard the annotated information and start the annotating process over again with different instructions that are hopefully clearer for the annotators. This results in significant amounts of wasted time and extends the time required to receive accurate annotated information. Additionally, since the requesting entity does not know what portion of the instructions was unclear or confusing, the new instructions provided by the requesting entity may not result in more accurate annotated information.

Accordingly, an embodiment provides a system and method for generating instructions for an annotation task in order to reduce mistakes made by annotators performing the annotation task. The system receives an annotation task and corresponding instructions for performance of the annotation task from a requesting entity, or client. Additionally, the requesting entity provides a set of correct annotations for a subset of the information included in the annotation task. The correct annotations may include annotations that are positive (e.g., annotations that fulfill the desired parameters) and negative (e.g., annotations that do not fulfill the desired parameters). The system then assigns the subset of information that has client annotations to a plurality of annotators. The correct annotations are not provided to the plurality of annotators. The instructions are also provided to the plurality of annotators.

The annotators perform the annotation task, utilizing the provided instructions, on the subset of information. From each of the plurality of annotators, the system receives or obtains annotations for the subset of information and also response times that identify how long it took for the annotator to provide the annotation for each piece of information within the subset. From the annotator annotations and response times, the system identifies areas of improvement within the instructions. Specifically, the system attempts to identify portions of the instructions that are causing confusion or that are unclear and, therefore, result in inaccurate or incorrect annotations. To identify these areas for improvement the system compares the annotator annotations to the client provided annotations to identify annotations provided by the annotators that are incorrect. Additionally, the system analyzes the response times to identify those pieces of information where the annotator required a significant length of time to provide the annotation. The annotator requiring additional time may indicate that the annotator was not sure whether the piece of information fulfilled the desired parameters. Thus, even if the provided annotation is correct, the response time may indicate an area of confusion.

The system groups the incorrect annotations into positive and negative classes based upon the correct annotation. In other words, incorrect annotations that should have been labeled as fulfilling the desired parameters are grouped into a positive class and incorrect annotations that should have been labeled as not fulfilling the desired parameters are grouped into a negative class. From each of these groups the system can perform feature extraction to identify features that distinguish the positive group from the negative group. In other words, the system performs feature extraction to identify at least one feature of the information that would assist in distinguishing entities fulfilling the parameters from entities that do not fulfill the parameters. Utilizing the extracted distinguishing feature, the system can generate an instruction to be added to the client provided instruction, thereby reducing the confusion caused by the original instruction set and resulting in more accurate annotations.

Such a system provides a technical improvement over current systems for performing annotation tasks. The system is able to identify areas of instructions that are unclear or causing confusion for annotators. The system can then identify features that would assist in distinguishing between positive and negative entities and generate instructions based upon these distinguishing features. These generated instructions can then be added to the original instruction set provided by the requesting entity. Thus, unlike conventional systems that rely solely on the instructions provided by the requesting entity, the described system can supplement the provided instructions by identifying areas of the initial instructions that are unclear or causing confusion and generating additional instructions addressing these areas of confusion. Such a system reduces the mistakes made by the annotators in annotating the information, thereby resulting in more accurate and complete annotated information.

FIG. 1 illustrates a method for generating instructions for an annotation task in order to reduce mistakes made by annotators performing the annotation task. At 101 the system may receive an annotation task and a set of instructions for performing the annotation task from a requesting entity or client. For example, the system may receive an annotation task from a client or other user who uploads or otherwise provides the annotation task to the system. The task may include different types of information annotation. For example, one type of annotation task may include annotating structured information. Structured information is information that is included within a known format, with each value of information belonging to a known attribute, feature, or label, and having a predetermined or specific format. For example, one column of structured information may be a geographical location of an entity corresponding to a row of the structured information. Thus, all the values within that column are known to be geographical locations. Additionally, all values included within a row are known to belong to the entity of the row. Examples of structured information include fields within a document, columns and rows within a spreadsheet, or any other information having a known label or belonging to a known attribute or feature and having a predefined structure.

Another type of annotation task may include annotating unstructured information. Unstructured information is information that does not have a known label or belongs to a known attribute or feature and that does not have a predetermined structure or format. For example, unstructured information may include freeform text that is provided within a comments section of a document. While the system knows that the information belongs to the comments section, the information provided within the comments section can be related to any number of different information labels and may be provided in any number of different formats or structures. Examples of unstructured information include books, news articles, freeform fields within a document, scientific papers, and the like. Other annotation tasks include annotating images, annotating videos, annotating audio, or the like. Thus, annotation may include labeling information, selecting information, converting information from one form to another, or otherwise providing additional information with respect to the information included in the task. For ease of readability, an example of labeling images as fulfilling or not fulfilling desired parameters will be used here throughout. However, it should be understood that the described system can be applied to any annotation task or any information type.

Figure 2:
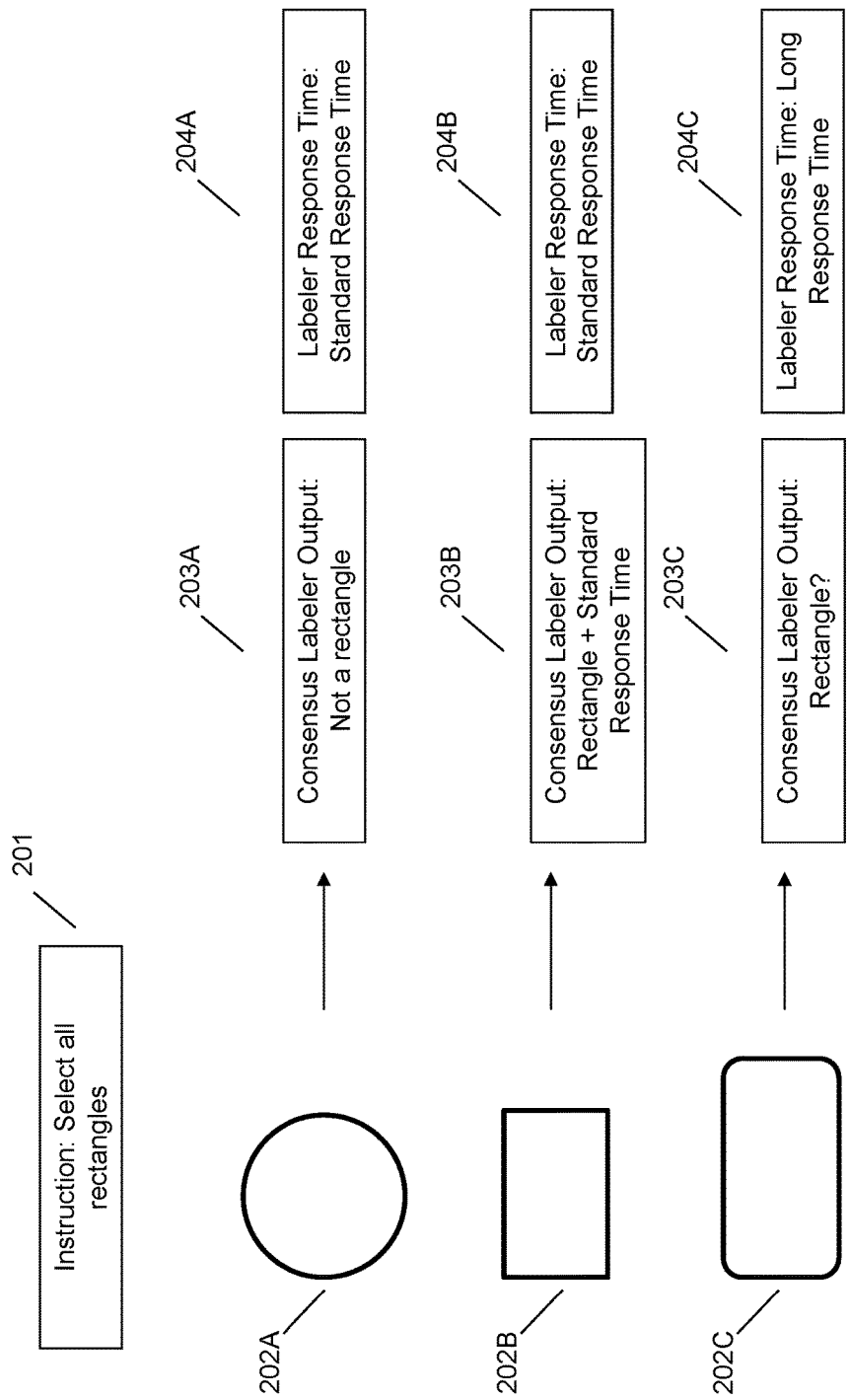
FIG. 2 illustrates an example annotation task with initial instructions.

The provided instructions may identify the parameters that describe a positive entity. In other words, the instructions provided by the client may identify what entity should be labeled as a positive entity. FIG. 2 illustrates a simple example of task annotation where the client has provided instructions 201 to select all the rectangles. Thus, an annotator would indicate or label images of rectangles as belonging to the positive group, or fulfilling the desired parameters. Conversely, the annotator would indicate or label images that are not rectangles as belonging to the negative group, or not fulfilling the desired parameters.

In addition to the annotation task and instructions, the client provides annotations for a subset of the information included in the annotation task. These annotations are correct annotations and identify what the client is expecting with regard to the annotations. In the client provided annotations, the client provides both positive entity samples and negative entity samples. In other words, the provided annotations identify entities within the information that the client is expecting to be annotated as fulfilling the parameters (positive) and information that the client is expecting to be annotated as not fulfilling the parameters (negative). The number of annotations provided by the client may vary depending on the complexity of the information to be annotated. For example, information that is more complex or has more complex instructions may require more annotation samples than less complex information.

At 102 the subset of information is assigned to a plurality of annotators. Assignment of the annotators may be performed using known annotator assignment techniques. Assigning the subset having client provided annotations allows for comparison of annotations provided by the annotators to the known or correct annotations. The entirety of the subset may be provided to all of the annotators or portions of the subset are provided to multiple annotators. By providing the same piece of information within the subset to multiple annotators, the system can more accurately identify areas of the instructions that are unclear or causing confusion. In other words, since more than one annotator is seeing and annotating the same information, the system can determine whether a mistake in annotation is caused by an issue with the instructions or simply the annotator.

After the annotators receive the subset, the annotators perform the annotation task on the subset utilizing the instructions provided by the client. Thus, at 103, the system obtains, from each of the annotators, annotations for the subset. Additionally, the system monitors the annotator response or reaction time for providing the annotations. The annotator response or reaction time identifies how long it took the annotator to annotate a particular piece of information included within the subset after the piece of information was presented to the annotator. For example, if it took the annotator five seconds to provide a label for an image after the image was presented, five seconds would be the response time. Once the annotations and response times are obtained, the system may group the annotations and corresponding response times by information entity. In other words, since the same piece of information was presented to multiple annotators for annotation, the system may group all of the annotations and corresponding response times for that piece of information. The system can then analyze the annotations and corresponding response times from all of the annotators with respect to the same piece of information.

Referring back to FIG. 2 as an example, the annotators are presented with three images 202A, 202B, and 202C. As stated above, the annotators are given instructions 201 to select all the rectangles. Accordingly, after the annotators annotate the information the system receives the responses 203A, 203B, and 203C. These responses indicate that 202A is not a rectangle, 202B is a rectangle, and 202C results in mixed annotations where some annotators labeled the image as a rectangle and some did not. Additionally, the response times for the annotations of both 202A and 202B are typical or standard response times 204A and 204B. On the other hand, the response time for the annotation of 202C is a longer than normal or longer than standard response time 204C. While the example of FIG. 2 illustrates the output or annotations and response times in the aggregate for ease of illustration, the system may keep each annotator output and/or response time separate from the other annotator output and/or response time.

At 104 the system may identify whether there are any discrepancies between the annotator provided annotations and the client provided or correct annotations. Since the subset that was provided to the annotators for annotation is the same subset that has client provided annotations, the system can compare the annotator provided annotations to the correct or expected annotations. This comparison allows the system to determine whether there are any discrepancies, mistakes, or mislabels made by the annotators. The system also takes into account the reaction time to identify discrepancies. For example, the system may have a threshold reaction time that identifies an average or maximum reaction time that it should take an annotator to provide an annotation once an information entity (e.g., image, text, article, etc.) is presented to the annotator. If the reaction time of the annotator is greater than the threshold reaction time, the system may identify the annotation as falling within a discrepancy regardless of the correctness of the annotation itself. In other words, if the annotator takes a long time to provide an annotation, the system may identify that the annotator is unclear or confused about whether the information entity fulfills the instructions or the spirit of the instructions. The threshold response time may be a default response time, a response time provided by the client or system, or an average or skewed average response time of the annotators. A skewed average response time may be an average response time plus an additional time in order to prevent half or a large number of the annotations from being classified as discrepancies.

If discrepancies are not identified at 104, the system may provide the entire annotation task and the existing instructions to annotators to perform the task. Providing the task and existing instructions to annotators may include the system selecting or assigning annotators from the crowdsourcing system.

If, alternatively, discrepancies are identified at 104, the system may identify improvements that can be made to the instructions in order to reduce discrepancies or mistakes at 105. To identify areas for improvements to the instructions, the system may identify which information entities were quickly and correctly annotated and which information entities were slowly and/or incorrectly annotated. Accordingly, once discrepancies are identified, the system may classify the annotated samples or information entities into two groups, one group where the annotator provided annotations match the correct annotations and one group where the annotator provided annotations do not match the correct annotations. This allows the system to form positive and negative samples or classes, with the positive samples including the annotations matching the correct annotations and the negative samples including the annotations not matching the correct annotations.

The system then generates instructions to address the discrepancies at 107. In other words, the system attempts to create instructions that would be clearer or cause less confusion than the instruction set provided by the client. The new instructions may include the addition of instructions that address the common mistakes or discrepancies made by the annotators. To generate the instructions, the system identifies at least one feature of the information that distinguishes incorrectly annotated information from the correctly annotated information. In other words, the system identifies one or more features that are unique to the information entities that fulfill the desired parameters, thereby, identifying one or more features that would distinguish the information entities that fulfill the parameters from the information entities that do not fulfill the parameters.

In identifying the features, the system utilizes a feature extraction technique. The technique that is used may be dependent on the information entity type. For example, if the information entity type is images, the system may use an image feature extraction technique that extracts image eccentric features. As another example, if the information entity type is text, the system may use a text feature extraction technique that extracts text eccentric features. Similar extraction techniques exist for other entity types such as audio, video, musical, and the like. Additionally, the selected feature extraction technique may be based upon a domain of the information. For example, one feature extraction technique may be more effective on animal images as opposed to shape images. As another example, one feature extraction technique may be more effective on legal text as opposed to scientific text.

The feature extraction is performed on both the positive and negative classes in order to identify features that match the positive class and that do not match the negative class. In other words, by performing the feature extraction on both the positive and negative class, the system can identify which features would distinguish between the two classes by identifying features that correlate with the positive samples. For example, using the example of FIG. 2, if the image of 202C is not supposed to be labeled as a rectangle, utilizing the feature of four sides to produce an instruction would not provide a distinguishing feature. On the other hand, if the image of 202C is supposed to be labeled as a rectangle, utilizing the feature of four sides to produce an instruction would provide a distinguishing feature.

In generating the instruction, the system may take the features identified as distinguishing features and rank them based upon a maximum overlap or correlation with the positive class. For example, a feature that only correlates with one information entity of the positive class would be ranked lower than a feature that correlates with multiple information entities of the positive class. In other words, features having a greater correlation to the positive class would be ranked higher than features having less correlation to the positive class. The identified features may additionally, or alternatively, be ranked based upon different standards than the correlation to the positive class. For example, the system may rank the features based upon the ease of producing an instruction encompassing the feature, with features that are easier to produce an instruction for having a higher ranking than features that are harder to produce an instruction for. As another example, the system may rank the features based upon a number of discrepancies associated with that feature. For example, if a particular information entity has a high number of discrepancies or mislabels, the system may attempt to select a feature from this information entity for producing an instruction. Thus, features associated with information entities having a high number of mislabels may be ranked higher than features associated with information entities having a lower number of mislabels. Other ranking techniques are possible and contemplated.

From the features the system can generate an instruction. Instructions may be generated for all of the distinguishing features, or, in the case that the features are ranked, features above a predetermined ranking. For example, the system may generate instructions based upon the top five ranked features. To generate the instructions the system may utilize a natural language generation technique to convert the identified feature into a natural language phrase or sentence that can be added to the instruction set. Additionally, or alternatively, the system may provide examples within the instruction set. For example, the system may provide an image of an information entity that should not be labeled as fulfilling the annotations. This may be particularly useful where an information entity that should be labeled as not fulfilling the parameters is very similar to an information entity that should be labeled as fulfilling the parameters. Using the example of FIG. 2, assuming image 202C should not be labeled as a rectangle, the system may simply provide image 202C as part of the instructions and indicate that it should not be labeled as a rectangle.

Once instructions are generated for each distinguishing feature or a predetermined number of distinguishing features, for example, the features ranked above a predetermined ranking, the system may add these instructions to the original instruction set. Adding the instructions may include simply appending the instructions to the original instruction set. Alternatively, the system may modify the original instruction set to include wording based upon the generated instructions. Once the new instruction set is generated, the entirety of the annotation task received at 101 and the new instruction set may be provided to annotators selected from the crowdsourcing system. Alternatively, the system may perform another sampling utilizing the new instruction set to determine if the new instruction set reduces the mistakes or discrepancy below a desired value, for example, below a particular threshold, below a particular percentage, or the like. With the new instruction set the number of discrepancies or mistakes made by the annotators should be reduced.

Figure 3:
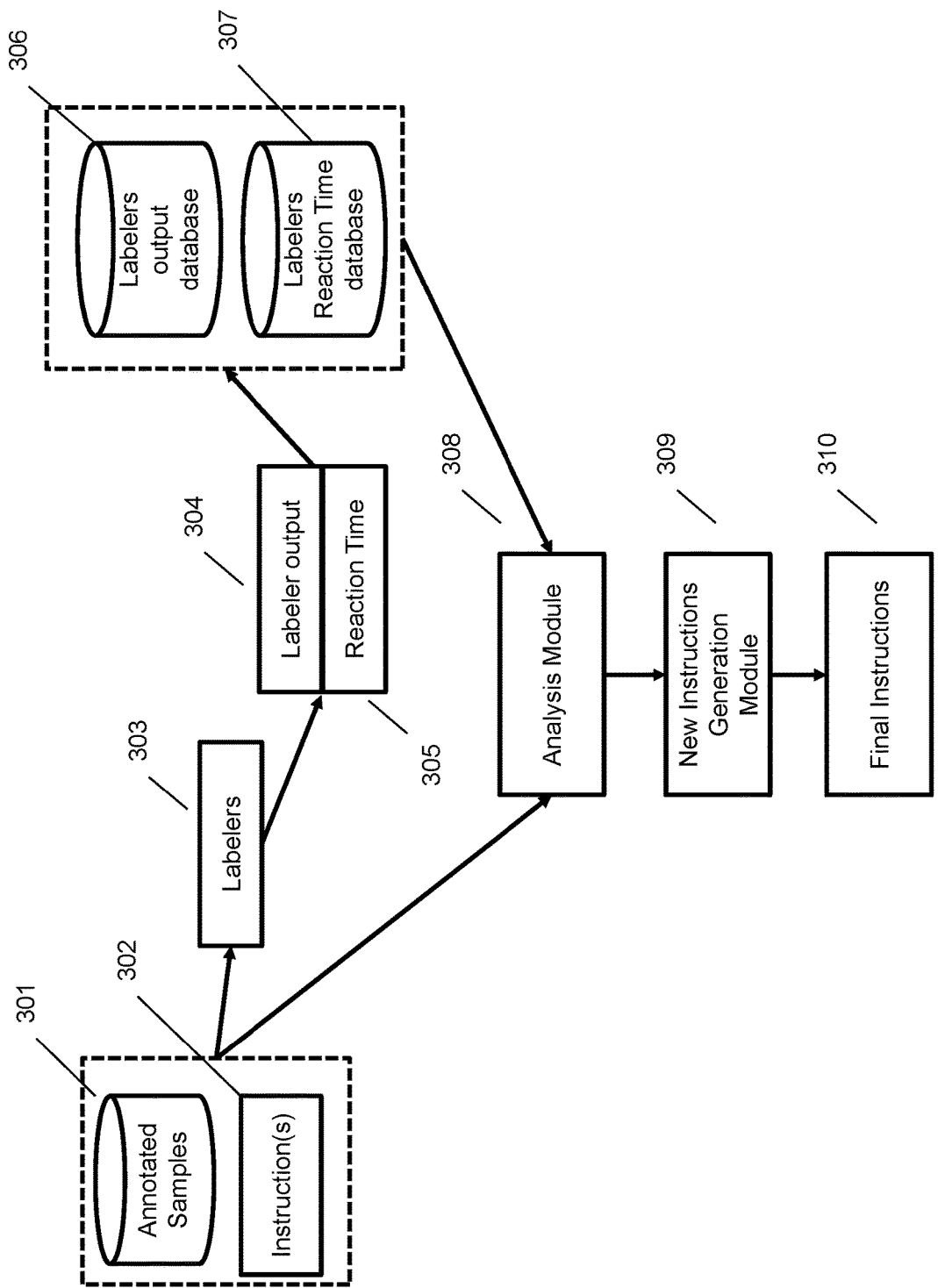
FIG. 3 illustrates an example system architecture for generating instructions for an annotation task in order to reduce mistakes made by annotators performing the annotation task.

FIG. 3 illustrates an overall example of the system architecture for generating instructions for an annotation task in order to reduce mistakes made by annotators performing the annotation task. The client or requesting entity provides annotated samples 301 indicating correctly annotated information and a set of instructions 302. These annotated samples 301, without the annotations, and instructions 302 are provided to a set of labelers 303 or annotators. As the labelers 303 perform the annotations, the system captures the labelers output 304 or annotations and the reaction time 305 for providing the annotations.

The labelers output 304 and reaction times 305 are provided to a labelers output database 306 and labelers reaction time database 307, respectively. The information from these databases 306 and 307 and the annotated samples 301, including the correct annotations, and instructions 302 are provided to an analysis module 308. The analysis module analyzes the labeler output 304 and reaction times 305 against the correct annotations provided by the client with the annotated samples 301 to identify distinguishing features to provide to the new instructions generation module 309. The new instructions generation module 309 utilizes the distinguishing features to generate new instructions to be added to the initial instructions 302 to create and provide final instructions 310 that are clearer and less confusing than the original instructions 302, thereby reducing the number of mistakes, discrepancies, and mislabels that will be provided by subsequent annotators or labelers.

Thus, the described systems and methods represent a technical improvement over current systems for performance of annotation tasks. It may be difficult for a client to provide complete instructions because the client knows how the information should be annotated and, therefore, may think that provided instructions are clear and not confusing. Thus, rather than relying on a client to provide complete and clear instructions, the system can generate additional instructions to be added to the instruction set that would result in more accurate and complete annotations. This helps ensure that the annotation task is performed in a similar manner by all the annotators and that the provided annotations closely fulfill the client expectations. Accordingly, the described system provides a technique that allows for crowdsourcing of annotation tasks while maintaining a higher level of accuracy than traditional systems, thereby resulting in more accurate and complete annotated information that can be utilized by a client in downstream tasks.

Figure 4:
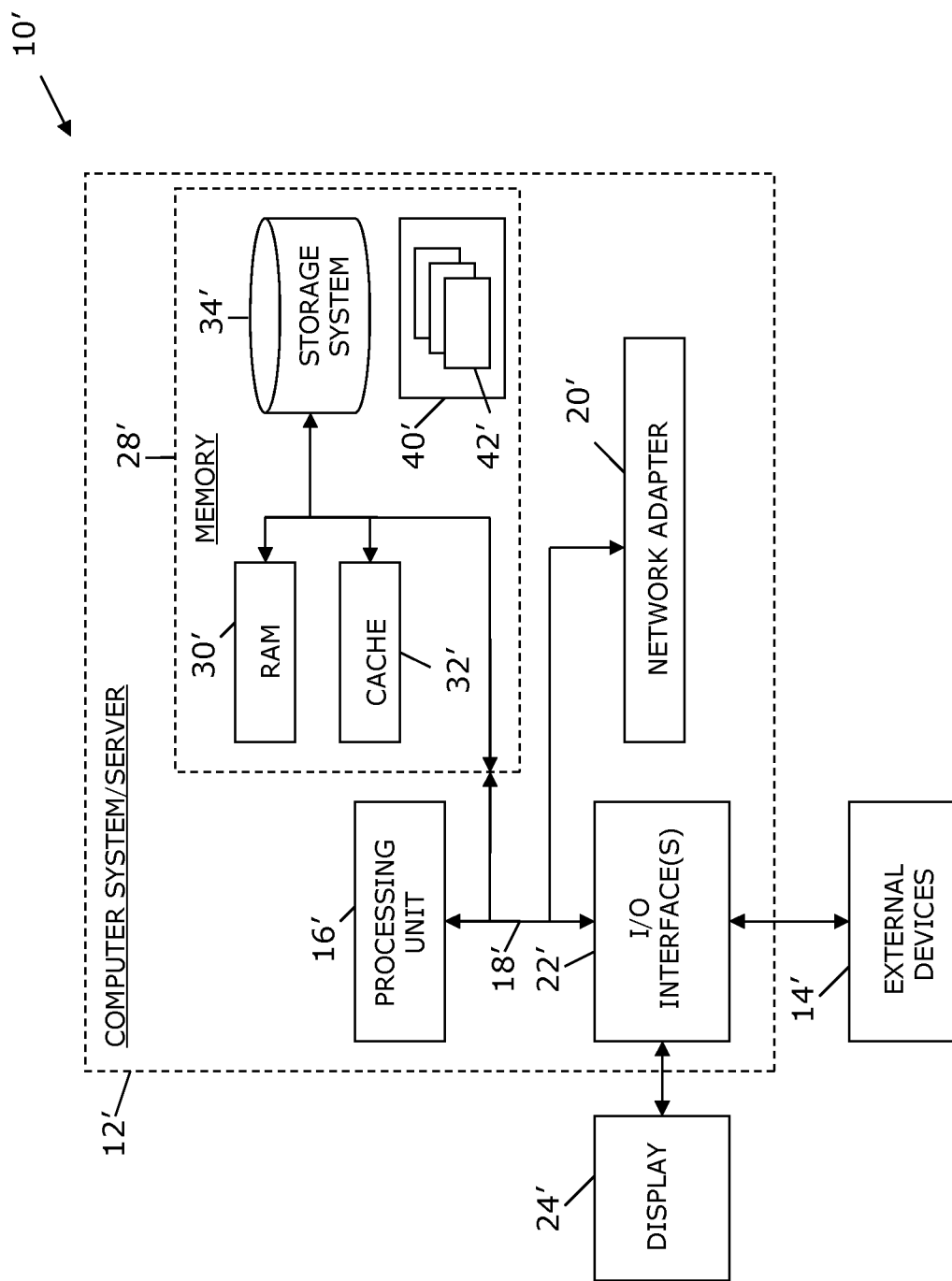
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   receiving, from a client, (i) a task of annotating information, (ii) a set of instructions for performing the task, and (iii) client annotations for a subset of the information within the task, wherein the client annotations identify correct annotations for the subset of information;
   assigning the subset to a plurality of annotators;
   obtaining, from each of the plurality of annotators, (i) annotator annotations for the subset and (ii) a response time for providing the annotator annotation for each piece of information within the subset;
   identifying improvements to the set of instructions by (i) comparing the annotator annotations to the client annotations and (ii) identifying, from the comparing, discrepancies between the annotations made by the annotators and the client annotations for a piece of information within the subset, wherein the identifying discrepancies is performed in view of the response time as compared to a threshold reaction time, wherein an annotation made by an annotator exceeding the threshold reaction time is identified as a discrepancy; and
   generating, based on the improvements, a new set of instructions for the task, wherein the generating comprises (i) identifying at least one feature of the information that distinguishes correctly annotated information from incorrectly annotated information and (ii) generating an instruction from the at least one feature, wherein the identifying at least one feature comprises utilizing a feature extraction technique, based upon an entity type of the information within the task, on both the correctly annotated information and the incorrectly annotated information.

2. The method of claim 1, wherein the identifying discrepancies comprises classifying the annotator annotations into one of (i) positive samples comprising annotator annotations matching the client annotations and (ii) negative samples comprising annotator annotations not matching the client annotations.

3. The method of claim 2, wherein the identifying at least one feature comprises performing feature extraction on (i) entities included in the positive samples and (ii) entities included in the negative samples, thereby identifying features correlating with the positive samples.

4. The method of claim 3, wherein the identifying at least one feature comprises ranking a feature having a greater correlation to the positive samples higher than a feature having less correlation to the positive samples.

5. The method of claim 1, wherein the identifying at least one feature comprises using a feature extraction technique on the discrepancies.

6. The method of claim 5, wherein the feature extraction technique utilized is based upon a domain of the information.

7. The method of claim 1, wherein the generating comprises ranking the at least one feature; and
wherein the generating an instruction comprises generating an instruction for features having a ranking above a predetermined ranking.

8. The method of claim 1, wherein the new set of instructions comprises an example of an incorrect annotation.

9. The method of claim 1, comprising providing the new set of instructions with the task to a plurality of annotators.

10. An apparatus, comprising:
at least one processor; and
a computer readable storage medium having computer readable program code embodied therewith and executable by the at least one processor, the computer readable program code comprising:
computer readable program code configured to receive, from a client, (i) a task of annotating information, (ii) a set of instructions for performing the task, and (iii) client annotations for a subset of the information within the task, wherein the client annotations identify correct annotations for the subset of information;
computer readable program code configured to assign the subset to a plurality of annotators;
computer readable program code configured to obtain, from each of the plurality of annotators, (i) annotator annotations for the subset and (ii) a response time for providing the annotator annotation for each piece of information within the subset;
computer readable program code configured to identify improvements to the set of instructions by (i) comparing the annotator annotations to the client annotations and (ii) identifying, from the comparing, discrepancies between the annotations made by the annotators and the client annotations for a piece of information within the subset, wherein the identifying discrepancies is performed in view of the response time as compared to a threshold reaction time, wherein an annotation made by an annotator exceeding the threshold reaction time is identified as a discrepancy; and
computer readable program code configured to generate, based on the improvements, a new set of instructions for the task, wherein the generating comprises (i) identifying at least one feature of the information that distinguishes correctly annotated information from incorrectly annotated information and (ii) generating an instruction from the at least one feature, wherein the identifying at least one feature comprises utilizing a feature extraction technique, based upon an entity type of the information within the task, on both the correctly annotated information and the incorrectly annotated information.

11. A computer program product, comprising:
a non-transitory computer readable storage medium having computer readable program code embodied therewith, the computer readable program code executable by a processor and comprising:
computer readable program code configured to receive, from a client, (i) a task of annotating information, (ii) a set of instructions for performing the task, and (iii) client annotations for a subset of the information within the task, wherein the client annotations identify correct annotations for the subset of information;
computer readable program code configured to assign the subset to a plurality of annotators;
computer readable program code configured to obtain, from each of the plurality of annotators, (i) annotator annotations for the subset and (ii) a response time for providing the annotator annotation for each piece of information within the subset;
computer readable program code configured to identify improvements to the set of instructions by (i) comparing the annotator annotations to the client annotations and (ii) identifying, from the comparing, discrepancies between the annotations made by the annotators and the client annotations for a piece of information within the subset, wherein the identifying discrepancies is performed in view of the response time as compared to a threshold reaction time, wherein an annotation made by an annotator exceeding the threshold reaction time is identified as a discrepancy; and
computer readable program code configured to generate, based on the improvements, a new set of instructions for the task, wherein the generating comprises (i) identifying at least one feature of the information that distinguishes correctly annotated information from incorrectly annotated information and (ii) generating an instruction from the at least one feature, wherein the identifying at least one feature comprises utilizing a feature extraction technique, based upon an entity type of the information within the task, on both the correctly annotated information and the incorrectly annotated information.

12. The computer program product of claim 11, wherein the identifying discrepancies comprises classifying the annotator annotations into one of (i) positive samples comprising annotator annotations matching the client annotations and (ii) negative samples comprising annotator annotations not matching the client annotations.

13. The computer program product of claim 12, wherein the identifying at least one feature comprises performing feature extraction on (i) entities included in the positive samples and (ii) entities included in the negative samples, thereby identifying features correlating with the positive samples.

14. The computer program product of claim 13, wherein the identifying at least one feature comprises ranking a feature having a greater correlation to the positive samples higher than a feature having less correlation to the positive samples.

15. The computer program product of claim 11, wherein the generating comprises ranking the at least one feature; and
wherein the generating an instruction comprises generating an instruction for features having a ranking above a predetermined ranking.

16. The computer program product of claim 11, wherein the new set of instructions comprises an example of an incorrect annotation.

17. The computer program product of claim 11, comprising providing the new set of instructions with the task to a plurality of annotators.

* * * * *